UNITED STATES PATENT OFFICE 2,175,190

ABSORBENTS FOR HYDROGEN SULPHIDE

John C. Goshorn and Paul O. Rockwell,
Baltimore, Md.

No Drawing. Original application July 1, 1935,
Serial No. 29,370. Divided and this application February 15, 1938, Serial No. 190,598

13 Claims. (Cl. 23—4)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to compositions for purifying air and oxygen-containing gases mixed with hydrogen sulphide, similar easily oxidizable hydrides, acid fumes, and organic vapors. The compositions are particularly intended for completely removing hydrogen sulphide from air. Charcoal, metallic oxides, and solutions of various acid and alkaline salts have been proposed for the purification of gases containing hydrogen sulphide and acid gases. Many of these purifying agents are heated in order to promote the reaction. Granular metal oxides and iodine compounds have also been used in gas masks for the oxidation of carbon monoxide.

This application is a division of our application Serial Number 29,370, filed July 1, 1935.

Among the objects of this invention is to provide adsorbents such as activated charcoal impregnated with reagents to increase their absorptive power at ordinary temperatures.

Another object of this invention is to provide absorbents for gas masks which will absorb hydrogen sulphide, gases containing oxidizable hydrogen, and noxious gases.

Another object of this invention is to increase the power of activated charcoal to semi-catalytically oxidize gases in air or an oxygen-containing atmosphere so as to increase its usefulness as a gas purifying agent.

Another object of this invention is to provide a single agent for the substantially complete absorption of hydrogen sulphide and organic vapors from air or oxygen-containing gases.

Active charcoal has the power of absorbing both oxygen and hydrogen sulphide from the air and forming sulphur and water. In order to remove all the hydrogen sulphide at the air velocities used in gas masks, it is necessary to increase the temperature of the charcoal and air above normal, or provide an excessively large volume of 8 to 14 mesh active carbon. The reagents which we propose using have the property of aiding the reaction at normal temperatures, probably because they react in air to form unstable compounds or they increase the ease of oxidation of the sulphide. With the iodine compounds, iodine may be formed in the carbon and take part in the reaction. These reagents are used as impregnants in active charcoal:

(1) Inorganic compounds of nonmetals such as iodine and arsenic, especially in the form of arsenic, iodic, and hydriodic acids and their salts, and particularly those which are water soluble. Also free iodine alone.

(2) Combinations of iodine, iodides and arsenates with alkaline or acid substances, particularly if the added acid or basic reagents are oxidizing reagents. Specifically, combinations such as copper oxide with iodine or potassium iodide, sulphuric acid with potassium iodide, arsenic acid with iodine or ferric nitrate with potassium iodide. The copper oxide is typical of certain metal oxides which are very reactive.

(3) Dry non-volatile, alkali metal hydroxides.

The preferred compounds for use as impregnants in active charcoal to absorb hydrogen sulphide are iodine, the iodides, iodates, arsenates and arsenites, as for example the sodium, potassium and ammonium salts. Other metal iodides, such as iron, zinc, copper, and lead, have also been found to increase the absorption of hydrogen sulphide. Impregnating solutions of 2 to 10% are satisfactory for depositing enough reagent to give a marked increase in the absorption except that a strength of 5 to 10% is preferred for the denser carbons. The impregnated charcoal may be made by soaking activated charcoal in a solution, draining a few minutes, and drying. The iodides are ordinarily heated at about 75° to 85° C. for several hours to remove the water and to form free iodine in the carbon. Other iodine and arsenic compounds are dried at about 40° to 50° C. A water content of 1 to 3% is preferred as this maintains the absorptive power of the carbon and also assists in the absorption of organic vapors. However, we may use carbon with moisture content increased after drying, for example 10% moisture.

The character of the charcoal has been found to exert a marked influence on the amount of hydrogen sulphide capable of being absorbed. Activated charcoals are graded commercially according to their absorptive power for organic vapors such as carbon tetrachloride or chlorpicrin. It has generally been accepted that the charcoals which have higher adsorptive power for chlorpicrin are superior adsorbents after impregnation for general use. Contrary to this, however, we have found that the carbon tetrachloride or chlorpicrin tests do not provide the most satisfactory basis of selection of charcoals to be used in the impregnated state for hydrogen sulphide absorption in accordance with our invention. Some impregnated charcoals absorb much less hydrogen sulphide than other carbons of equal adsorptive power (as measured for example by the accelerated chlorpicrin activity) and similarly impregnated. For example, some charcoals of 20 to 30-minute life on the accelerated chlorpicrin test are distinctly superior to others of 40-50 minute life. Even certain types of charcoals of the 10-minute accelerated chlorpicrin grade have given excellent results. In selecting charcoal for impregnation in accordance with our invention, the apparent density or the block density is an excellent guide in collaboration with the accelerated chlorpicrin tests or the heat of wetting in benzene. In general, we prefer to use active charcoals of medium or low apparent density as for example 0.25 to 0.45 on the 12–16 U. S. Standard size. Thus we prefer to use a 25-minute charcoal of .35 density rather than a 50-minute charcoal density exceeding 0.55.

No particular advantage in hydrogen sulphide absorption in the use of the lower density charcoals in gas mask canisters has been found when commercial activated charcoals are not impregnated. But on impregnation with alkaline reagents which react with hydrogen sulphide, the absorption is greatly improved (5 to 15 fold). For charcoals of the same chlorpicrin activity, this improvement is larger with moderate and low density charcoals than with those of high density.

More striking perhaps is the observation that by using charcoals of low density (0.19 to 0.4) we obtain as good or better hydrogen sulphide absorption with about 25-min. carbons than with 45-min. charcoals of density exceeding 0.5, when both types are impregnated with equal amounts of caustic and dried to 1 to 2% water content.

The packing of the tubes for measuring the apparent density and the measurement of the chlorpicrin life is described in the Journal of Industrial and Engineering Chemistry, vol. II, p. 520–524. The density tests should be made on granules which are roughly spherical, as the object is to measure differences in the porosity of the granules and not differences in packing due to differences in shape. The density and chlorpicrin test values are on charcoal dried at 150° C. without impregnation.

We have found that impregnating activated charcoal with the oxygen acids of arsenic, $As_2O_3$ and $As_2O_5$, and their salts, improves the absorptive power of the charcoal so that only a moderate amount of charcoal is required to remove the hydrogen sulphide from air to be breathed. The preferred compounds are the water-soluble salts such as the alkali-metal salts. Ammonium salts are alkali-metal salts. Other compounds which are also effective impregnants are the oxides of arsenic, magnesium ammonium arsenate and the metal salts as copper, iron, nickel, zinc, lead, etc. The charcoal should contain about 5% of the impregnant though this may be varied somewhat. If non-reactive organic vapors are to be absorbed with hydrogen sulphide, the impregnated charcoal should have a low water content. If reactive acid vapors are in the contaminated air, a slight amount of free alkali may be added to the alkali-metal salt of arsenic prior to impregnation.

The charcoal may be impregnated by soaking in an aqueous solution containing for example 5% of sodium arsenate, draining and drying at about 100° C. It is advantageous to use charcoal of 0.3 to 0.5 apparent density having a high absorptive power for organic vapors.

The insoluble salts of the oxygen acids of arsenic should be impregnated by mixing solutions containing the metal nitrate and arsenic acid or arsenious acid in stoichiometric proportions, adding arsenic or nitric acid to dissolve the arsenic salt and immersing the charcoal in the solution. The charcoal is drained and dried at about 150° C.

Alkalies and ammonium salts may also be used to solubilize the metal arsenite or arsenate.

In a specific embodiment of the invention charcoal of 0.3 to 0.4 apparent density and about 30 minute chlorpicrin activity is soaked in a 10% solution of sodium arsenate containing a slight excess of caustic. The excess solution is drained off and the charcoal dried to less than 5% water content at about 60° C. in an air drier for 16 hours. The low water content is used to assist the absorption of stable organic vapor; 350 cc. of 8–16 U. S. Standard mesh on a canister test against 5000 parts per million of hydrogen sulphide in air flowing at 32 l./min. completely absorbed the hydrogen sulphide for 50 to 100 minutes as against 5 minutes for the same unimpregnated active charcoal. The alkali arsenite has shown approximately the same absorption as the arsenate. Active charcoal impregnated with 5% sodium iodide or 5% ammonium iodate has protected for 50 to over 100 minutes on the same test.

Non-metal hydrides having an oxidizable hydrogen include the hydrides of arsenic and sulphur, in which the hydrogen is oxidized at room temperature by a weak aqueous solution of an oxidizing agent.

By a water soluble compound, we mean one having a solubility in excess of 3% at 25° C. By dry charcoal we mean one which is substantially dry, for example, less than 3% water content.

While we prefer to impregnate the reagents enumerated above in activated charcoal of the most suitable density, we do not desire to be limited to these reagents in our discovery of the advantage for hydrogen sulphide absorption of selecting activated carbon of about 0.2 to 0.5 apparent density and moderate chlorpicrin activity, as for example 25 to 40 min. On the other hand the chlorpicrin activity of the carbon should exceed 10 min. and preferably be at least 20 min.

When active charcoal is used as the carrier, we are limited as to the concentration against which protection can be afforded because active charcoal can be ignited by the heat of oxidation of hydrogen sulphide. At rapid breathing rates such as 32 l./min., concentrations of 1% by volume are satisfactorily absorbed. A concentration of 2% may ignite the charcoal at the stated air gas velocity, though ignition of the carbon by a 2% concentration at markedly lower velocities would not occur because the heat evolution would be correspondingly reduced.

While we have described the preferred embodiments of our invention, we wish it to be understood that we do not confine ourselves to the precise details herein set forth by way of illustration as it is apparent that many changes and variations may be made therein by those skilled in the art without departing from the spirit of the invention or exceeding the scope of the appended claims.

We claim:

1. A process for the complete purification of gases containing a large amount of oxygen and a small proportion of hydrogen sulphide which comprises contacting the gases with activated charcoal impregnated with an inorganic compound of an oxygen acid of arsenic.

2. A process for the complete purification of air containing hydrogen sulphide which comprises contacting said air with activated charcoal impregnated with an inorganic compound of an oxygen acid of arsenic.

3. A process for the complete purification of air containing hydrogen sulphide which comprises contacting said air with activated charcoal impregnated with a metal salt of an oxygen acid of arsenic.

4. A process for the complete purification of air containing hydrogen sulphide which comprises contacting said air with activated charcoal impregnated with an inorganic, water-soluble compound of arsenic and oxygen.

5. A process for the complete purification of air containing hydrogen sulphide which comprises contacting said air with activated charcoal impregnated with an inorganic, water-soluble salt of an oxygen acid of arsenic.

6. A process for the complete purification of air containing hydrogen sulphide which comprises contacting said air with activated charcoal impregnated with an alkali-metal salt of an oxygen acid of arsenic.

7. A process for the complete purification of air containing hydrogen sulphide which comprises contacting said air with activated charcoal impregnated with an alkali-metal salt of arsenic acid.

8. A process for the complete purification of air containing hydrogen sulphide which comprises contacting said air with activated charcoal impregnated with an oxide of arsenic.

9. A process for the complete purification of air containing hydrogen sulphide which comprises contacting said air with activated charcoal of low water content and impregnated with an alkali-metal salt of an oxygen acid of arsenic.

10. A filter for the complete purification of air to be breathed which comprises activated charcoal impregnated with a metal salt of an oxygen acid of arsenic.

11. A filter for the complete purification of air to be breathed which comprises activated charcoal impregnated with an alkali-metal salt of an oxygen acid of arsenic.

12. A process for the complete purification of air containing hydrogen sulphide which comprises contacting the air with activated charcoal of 0.18 to 0.5 apparent density and 10 to 45 minute chlorpicrin activity impregnated with an inorganic compound of an oxygen acid of arsenic.

13. A process for the complete purification of air containing hydrogen sulphide which comprises contacting the air with activated charcoal of 0.18 to 0.5 apparent density and 10 to 45 minute chlorpicrin activity impregnated with an inorganic water-soluble compound of arsenic and oxygen.

JOHN C. GOSHORN.
PAUL O. ROCKWELL.